United States Patent
Gao et al.

(10) Patent No.: US 8,508,880 B2
(45) Date of Patent: Aug. 13, 2013

(54) TRANSDUCER HEAD WITH MULTIPLE READ SENSORS

(75) Inventors: Kaizhong Gao, Eden Prairie, MN (US); Olle Heinonen, Eden Prairie, MN (US); Yonghua Chen, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/028,915

(22) Filed: Feb. 16, 2011

(65) Prior Publication Data

US 2012/0206830 A1    Aug. 16, 2012

(51) Int. Cl.
*G11B 21/02*    (2006.01)

(52) U.S. Cl.
USPC .......................................................... 360/75

(58) Field of Classification Search
None
See application file for complete search history.

(56) References Cited

U.S. PATENT DOCUMENTS

| | | | |
|---|---|---|---|
| 4,656,546 A | 4/1987 | Mallory | |
| 6,021,024 A | 2/2000 | Akiyama et al. | |
| 6,504,675 B1 | 1/2003 | Shukh et al. | |
| 6,771,441 B2 | 8/2004 | Tang et al. | |
| 6,882,488 B1 | 4/2005 | Albrecht et al. | |
| 6,954,340 B2 | 10/2005 | Shukh et al. | |
| 7,072,147 B2 | 7/2006 | Limmer et al. | |
| 7,126,773 B1 | 10/2006 | Taratorin | |
| 7,251,878 B2 | 8/2007 | Le et al. | |
| 7,253,992 B2 | 8/2007 | Chen et al. | |
| 7,265,941 B2 | 9/2007 | Le et al. | |
| 7,352,526 B2 | 4/2008 | Takaishi | |
| 7,429,857 B2 | 9/2008 | Guzik et al. | |
| 7,430,095 B2 | 9/2008 | Benakli et al. | |
| 7,436,621 B2 * | 10/2008 | Goker et al. | 360/76 |
| 7,436,632 B2 | 10/2008 | Li et al. | |
| 2002/0131213 A1 * | 9/2002 | Tsuchiya | 360/317 |
| 2007/0201160 A1 * | 8/2007 | Albrecht et al. | 360/75 |
| 2009/0002896 A1 | 1/2009 | Mallary et al. | |
| 2009/0284874 A1 | 11/2009 | Yin et al. | |
| 2010/0110575 A1 | 5/2010 | Gao | |

OTHER PUBLICATIONS

Meloche, Eric, "Perpendicular Recording at High Areal Densities," Seagate, Feb. 14, 2008, 41 pages.

* cited by examiner

*Primary Examiner* — Regina N Holder
(74) *Attorney, Agent, or Firm* — HolzerIPLaw, PC

(57) ABSTRACT

In order to improve a consistent data track during writing to a storage medium, a plurality of read sensors are affixed to a transducer head. In one implementation, the transducer head includes multiple read sensors placed up-track of the write pole. In another implementation, the transducer head includes at least one read sensor placed up-track of the write pole and at least one read sensor placed down-track of the write pole. Each position of the multiple read sensors relative to the write pole may be unique. One or more read signals of selected read sensors are used to determine the read location and therefore the write pole location relative to the storage medium.

20 Claims, 6 Drawing Sheets

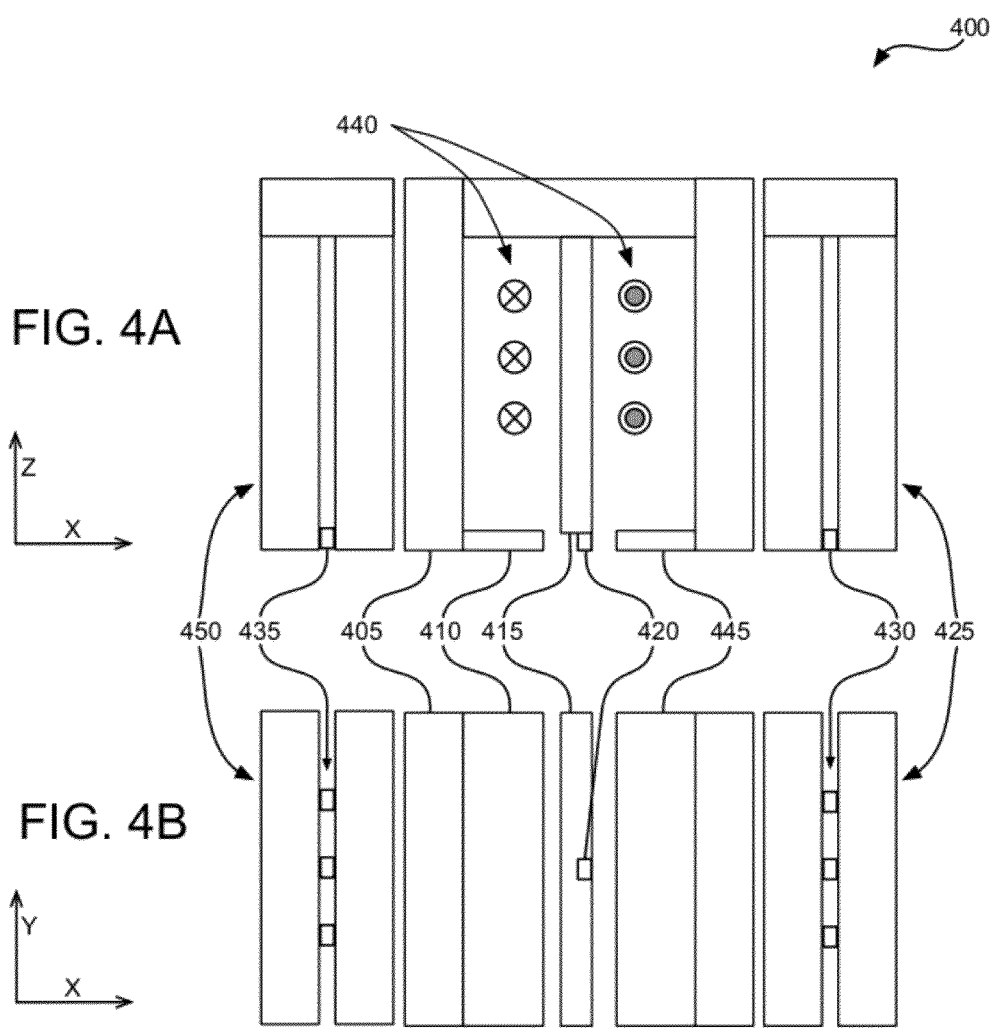

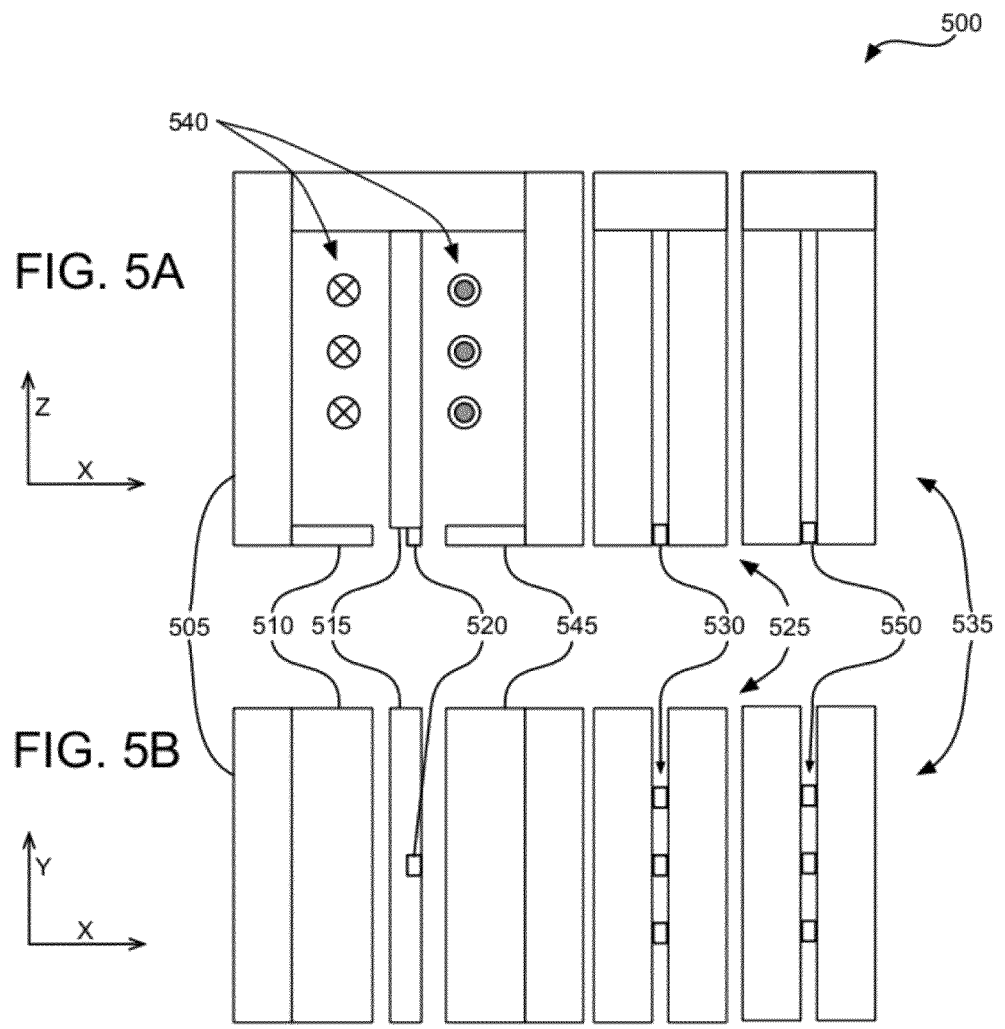

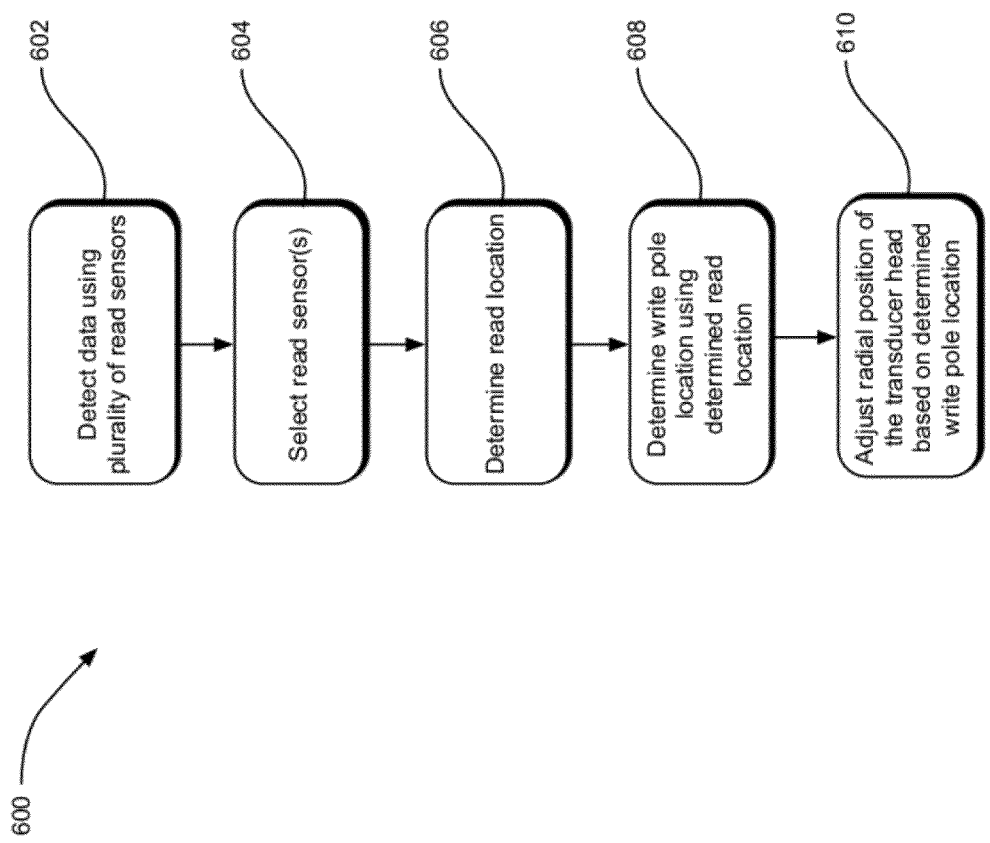

TRANSDUCER HEAD WITH MULTIPLE READ SENSORS

SUMMARY

A transducer head comprising a write pole and a plurality of read sensors placed at offsets from the write pole. The offsets may represent distances in a data track direction and/or in a cross data track direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

The described technology is best understood from the following Detailed Description describing various implementations read in connection with the accompanying drawings.

FIGS. 4A and 4B illustrate two views of an example transducer head with multiple read sensor sets, each with multiple read sensors, located down and up-track of a write pole.

FIGS. 5A and 5B illustrate two views of an example transducer head with multiple read sensor sets and multiple reader shields, the read sensor sets being located up-track of a write pole.

FIG. 6 depicts a flow diagram illustrating example operations for using multiple read sensors to accommodate various alignments of a transducer head with a storage medium to maintain a consistent data track during writing.

DETAILED DESCRIPTION

Figure 1:
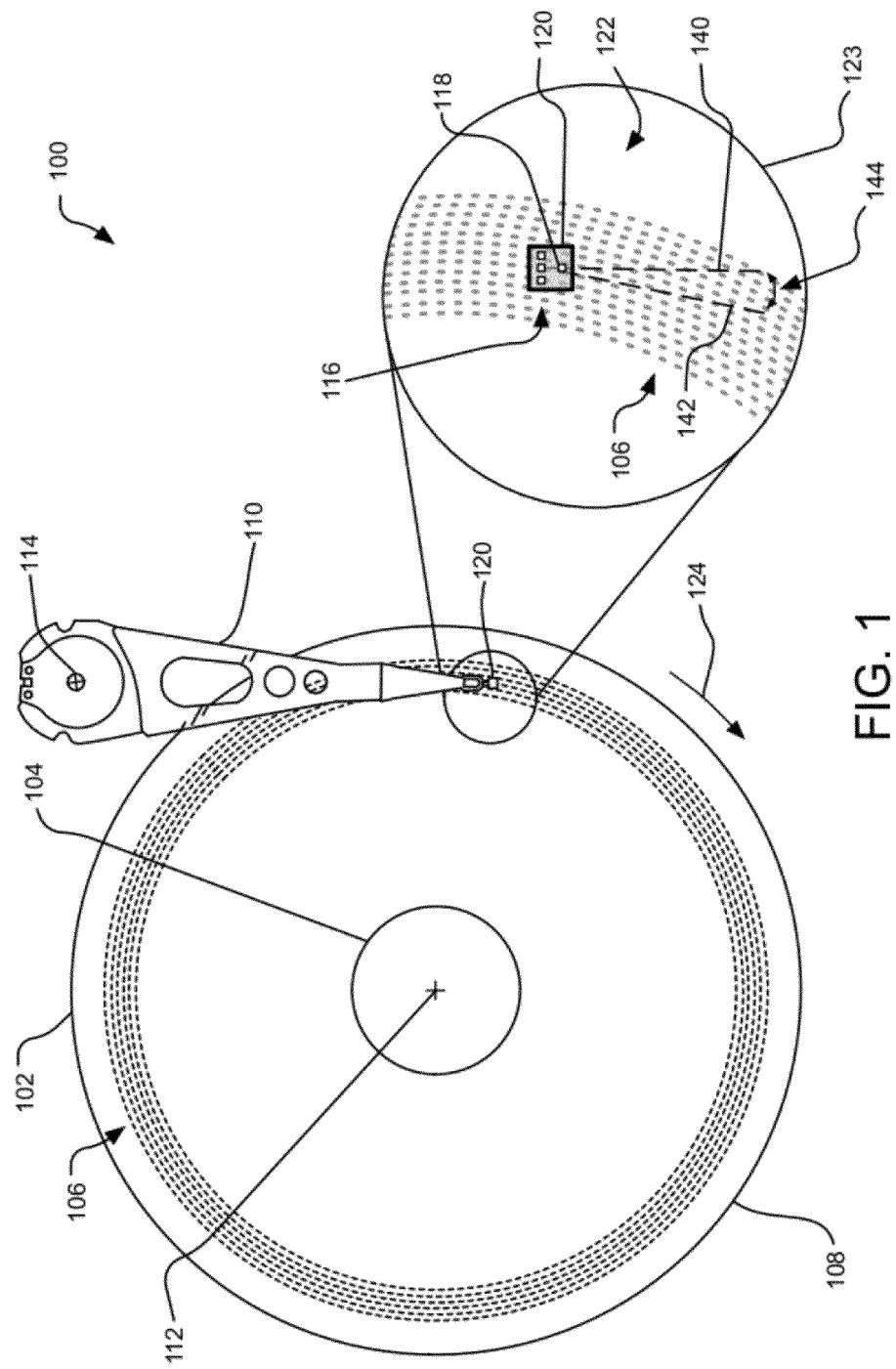
FIG. 1 illustrates a plan view of an example transducer head with multiple read sensors.

During a write operation to a hard disc drive by a transducer head, the transducer head can use a read sensor to read a reference track containing position information. Based on a read signal detected from the storage medium by the read sensor, the storage system (e.g., a hard disc drive) can determine the position of the read sensor with respect to the storage medium and, therefore, the position of a write pole positioned relative to the read sensor on the transducer head. In this manner, the read sensor is useful in maintaining the alignment of the write pole with a target data track on the storage medium.

In some implementations, the reference track is the same as the target data track and stores position information that is read by the read sensor to determine the position of the write pole elsewhere in the target data. In an alternative implementation, the reference track is separate from the target data track (e.g., a dedicated reference track or another data track) and stores position information read by the read sensor to determine the position of the write pole with respect to the target data track. In both implementations, the location information read by the read sensor can be used to manage position and timing of the write signal generated by the write pole.

Under certain conditions, however, the angle between the data track and the transducer head can change the alignment between a write pole and a particular read sensor relative to one or more tracks on the storage medium. If the read sensor/write pole alignment does not change substantially as the head moves across the surface of the storage medium from inner diameter (ID) to outer diameter (OD), then the read sensor and the write pole are considered to maintain a relatively consistent track. In contrast, even a small change in the alignment can cause inconsistent tracking and therefore interfere with reading and writing of data on a magnetic recording disc with a high track density. The described technology, however, provides multiple read sensors for a single transducer head, thereby dramatically increasing the probability that one or more of the multiple read sensors will be aligned on the appropriate reference track for the write pole at any operational angle.

Bit Patterned Media (BPM), which is contemplated as an option for dramatically increasing areal densities, refers to a magnetic storage technology used to record data in a consistent array of magnetic cells structurally formed in a storage medium. The BPM cells may be pre-patterned through various procedures such as, but not limited to, photolithography, ion-milling, etc. For example, each magnetic cell may be pre-patterned in the storage medium using photolithography by which a mask pattern is recorded using high-resolution electron beam. The mask pattern is used to selectively etch the magnetic cells in magnetic material deposited on the surface of the storage medium. In one implementation, each magnetic cell stores a single bit and is isolated from all other cells by a finite, non-magnetic region of the storage medium.

Maintaining alignment of a read sensor and a write pole of a transducer head on a target data track becomes more challenging as areal densities increase, particularly to the dimensions provided by BPM. For example, the distance in the data track direction between a write pole and a read sensor may be an order of magnitude greater than a relevant distance on BPM.

However, a transducer head including a plurality of read sensors increases the likelihood that a read signal from at least one of the read sensors will return beneficial reference track information corresponding to the write pole location. While writing to a disc, a transducer head with multiple read sensors can better maintain alignment of the write pole with the desired target track. For example, multiple read sensors increase the likelihood that at least one of the read sensors will be located over the appropriate reference track for the write pole. Processing the read signal obtained from the read sensor over a bit (e.g., as recorded in a cell or island) in the appropriate reference track may allow a write pole to maintain a consistent track during a write process. In one implementation, a transducer head includes multiple read sensors placed up-track relative to the write pole. In another implementation, a transducer head includes multiple read sensors placed up-track relative to the write pole, with some of the read sensors being separated by reader shields. In yet another implementation, a transducer head includes at least one read sensor placed up-track relative to the write pole and at least one read sensor placed down-track relative to the write pole.

FIG. 1 illustrates a plan view 100 of an example transducer head 120 with multiple read sensors 116. A disc 108 rotates about a disc axis of rotation 112 during operation. Further, the disc 108 includes an outer diameter 102 and inner diameter 104 between which are a number of concentric data tracks 106, illustrated by circular dashed lines. The data tracks 106 are substantially circular and are made up of regularly spaced patterned bits 122, indicated as dots or ovals on the disc 108 as well as in exploded view 123. It should be understood, however, that the described technology may be employed with other types of storage media, including continuous magnetic media and discrete track (DT) media.

Information may be written to and read from the patterned bits 122 on the disc 108 in different data tracks 106. The transducer head 120 is mounted on an actuator assembly 110 at an end distal to an actuator axis of rotation 114 and flies in close proximity above the surface of the disc 108 during disc operation. The actuator assembly 110 rotates during a seek operation about the actuator axis of rotation 114 positioned adjacent to the disc 108. The seek operation positions the transducer head 120 over a target data track. The exploded view 123 shows the transducer head with three read sensors 116 in a row positioned up-track from a writer 118 (shown as a write pole) relative to the data tracks 106 (with the actuator assembly 110 omitted).

In one implementation, the transducer head 120 progresses along a target data track as the disc 108 rotates in the substantially circular direction 124. At the point at which the transducer head 120 is positioned over the target data track, an axis 140 of the transducer head (e.g., as defined by a line intersecting the center read sensor and the writer 118) is angled (see angle 144) relative to a tangent 142 of the target data track at the transducer head 120.

By incorporating multiple read sensors 116 onto the transducer head 120, the storage system can monitor read signals from each of the read sensors 116, using one of more of these read signals to determine the position of the writer 118 relative to the target data track. In one implementation, one or more of the read sensors 116 are likely to be aligned over the same data track (e.g., a reference track) as the writer 118 so as to obtain accurate positioning information. In another implementation, one or more of the read sensors 116 are likely to be aligned over a separate reference track (e.g., a dedicated reference track or another data track containing position information pertaining to the target data track). Further, in one implementation, the transducer head 120 performs a read before write process to maintain the transducer head 120 over the target data track, although other writing processes may be employed.

For purposes of illustration, a data track direction represents a direction along a circumference or a tangent of a data track and a cross track direction represents a direction that crosses the width of a track (e.g., along a radius). "Up-track" refers to the direction of head travel relative to the track. By configuring a transducer head with multiple read sensors laid out at unique data track direction offsets and cross track direction offsets from a write pole, the likelihood that at least one of the read sensors is aligned sufficiently with the same data track as the write pole.

Figure 2:
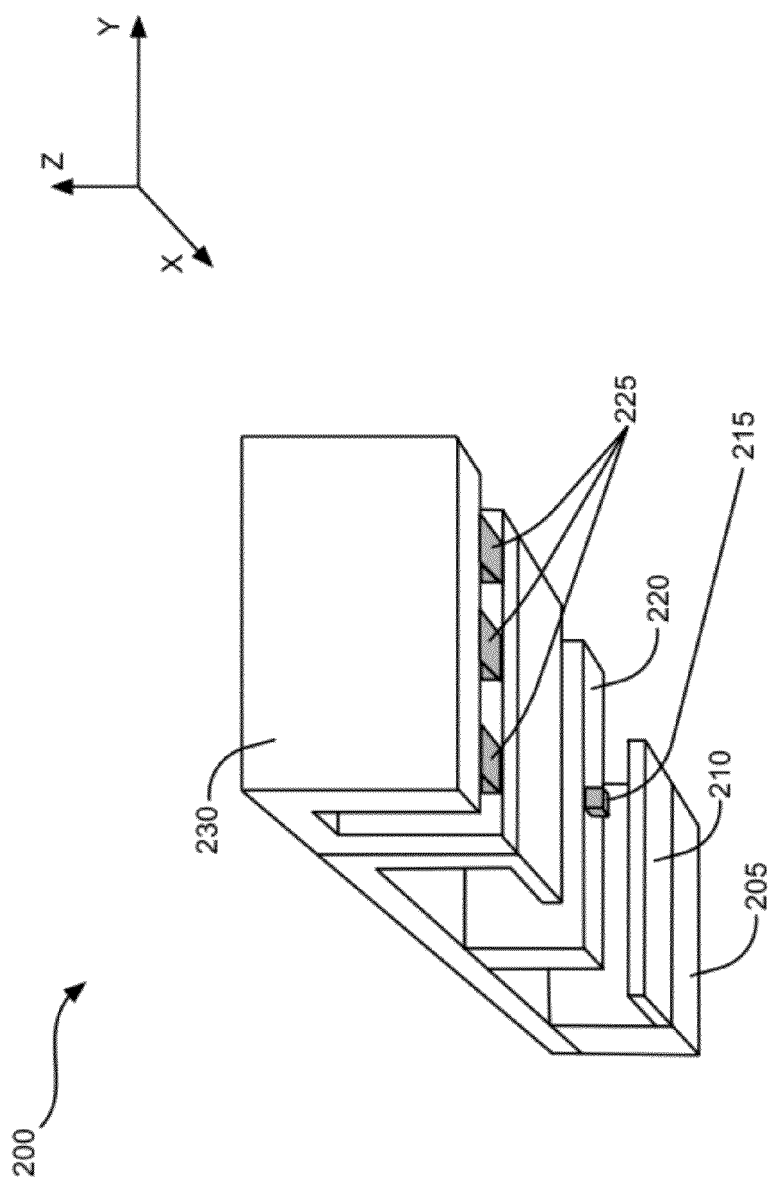
FIG. 2 illustrates a perspective view of an example transducer head with multiple read sensors, the read sensors being located up-track of a write pole.

FIG. 2 illustrates a perspective view of an example transducer head 200 with multiple read sensors 225 located up-track of a write pole 215. The X, Y, Z labeled axis is meant for illustrative purposes only and is not meant to limit the scope of the invention. In FIG. 2, the X axis indicates the length of the transducer head 200, the Y axis indicates the width of the transducer head 200, and the Z axis indicates the height of the transducer head 200. The transducer head 200 includes the write pole 215 and a return pole 205, which are coupled by a yoke 220 and separated by front shield 210. In operation, electric current in a coil positioned around the yoke 220 creates a magnetic field in the return pole 205 and the write pole 215 that may be used to affect the magnetization of an associated storage medium.

The read sensors 225 are contained by a read shield 230, which is positioned up-track of the write pole 215. In the implementation depicted in FIG. 2, the read sensors 215 are all contained by the same read shield 230. The plurality of read sensors 225 have different write pole to read sensor offsets in one or more of the data track direction and the cross track direction, thereby allowing a determination of the write pole 215 position by analyzing information associated with any of the read sensors 225 that return a relevant read signal. In other words, different read sensors 225 may be used to assist the write pole 215 to maintain a desired data track for data tracks from the inner diameter to the outer diameter of the associated storage medium.

In one implementation, the read sensor generating a read signal having the greatest signal-to-noise ratio (SNR) is selected as the read signal used to track with the write pole. In another implementation, multiple read signals (e.g., two or more adjacent read signals exhibiting a substantially synchronized phase) can be summed together to provide a signal with an enhanced-SNR read signal. In this case, the read sensors generating these read signals are selected for determining the read location. In yet another implementation, a predetermined read sensor is selected depending on the radial location of the transducer head above the disc surface. For example, a calibration process can generate a map identifying the best-aligned read sensor (or sensors) to be used in tracking the write pole.

Furthermore, the approach of summing multiple read signals to enhance the SNR can be beneficial during a readback operation. A readback operation represents an operation in which a read signal is generated by the transducer head based on detection of bits (e.g., magnetic fields) from the storage medium surface by one or more read sensors. When a single read sensor is used, the read signal is based on sensing the magnetic fields emanating from bits recorded on the storage medium. Ideally, a single read sensor would detect only the magnetic field from a single bit at any particular point in time. However, as dimensions continue to decrease on the storage medium, the relative dimensions of the recorded bits (whether on a continuous storage medium, a discrete track storage medium, a bit patterned medium, etc.), the inter-bit distances, and the read sensor sizes combine to cause a single read sensor to detect a primary magnetic fields from the closest bit location but to also detect secondary magnetic fields from adjacent bit locations. These secondary magnetic fields contribute to noise in the read signal, which can be evaluated using an SNR measurement relative to the primary magnetic field.

Beneficially, when multiple sensors are used, the detected read signals from multiple read sensors can be summed to amplify the primary magnetic field relative to the secondary magnetic fields of each read signal. For example, if two adjacent read sensors are straddling a single bit, each sensor detecting a somewhat diminished primary magnetic field from the bit (because of the slight misalignment from the bit) while also detecting secondary magnetic fields from other nearby bit locations, then the read signals can be summed together to effectively amplify the read signal portion corresponding to the primary magnetic field detected by the two read sensors over the read signal portion corresponding to the secondary magnetic fields. Accordingly, this technique enhances the SNR, which reduces the bit error rate (BER) during readback operations.

As depicted in FIG. 2, transducer head 200 has three read sensors 225, although the number and placement of read sensors 225 may differ in various implementations. In one implementation, the plurality of read sensors includes at least ten read sensors. In another implementation, the number of read sensors is determined as a function of the areal density of the associated BPM. The contemplated number of read sensors 225 is unlimited in the described technology, although certain implementations may be limited by fabrication constraints or engineering choice.

Each read sensor presents a unique offset relative to the write pole 215. Therefore, the multiple read sensors increase the probability that at least one read sensor is positioned on the same track as the write pole, regardless of the head-to-track angle (within realistic bounds) between the track and the transducer head.

It should be understood that an offset along one axis (e.g., data track direction offset along the X axis, cross track direction offset along the Y axis) may be a zero magnitude offset while the offset along another axis is non-zero. For example, both the write pole and one of the read sensors may be located at the same position on the Y axis (e.g., the center of the transducer head) while being offset on the X axis (e.g., the read sensor being positions up-track from the write pole).

Figures 3A, 3B:
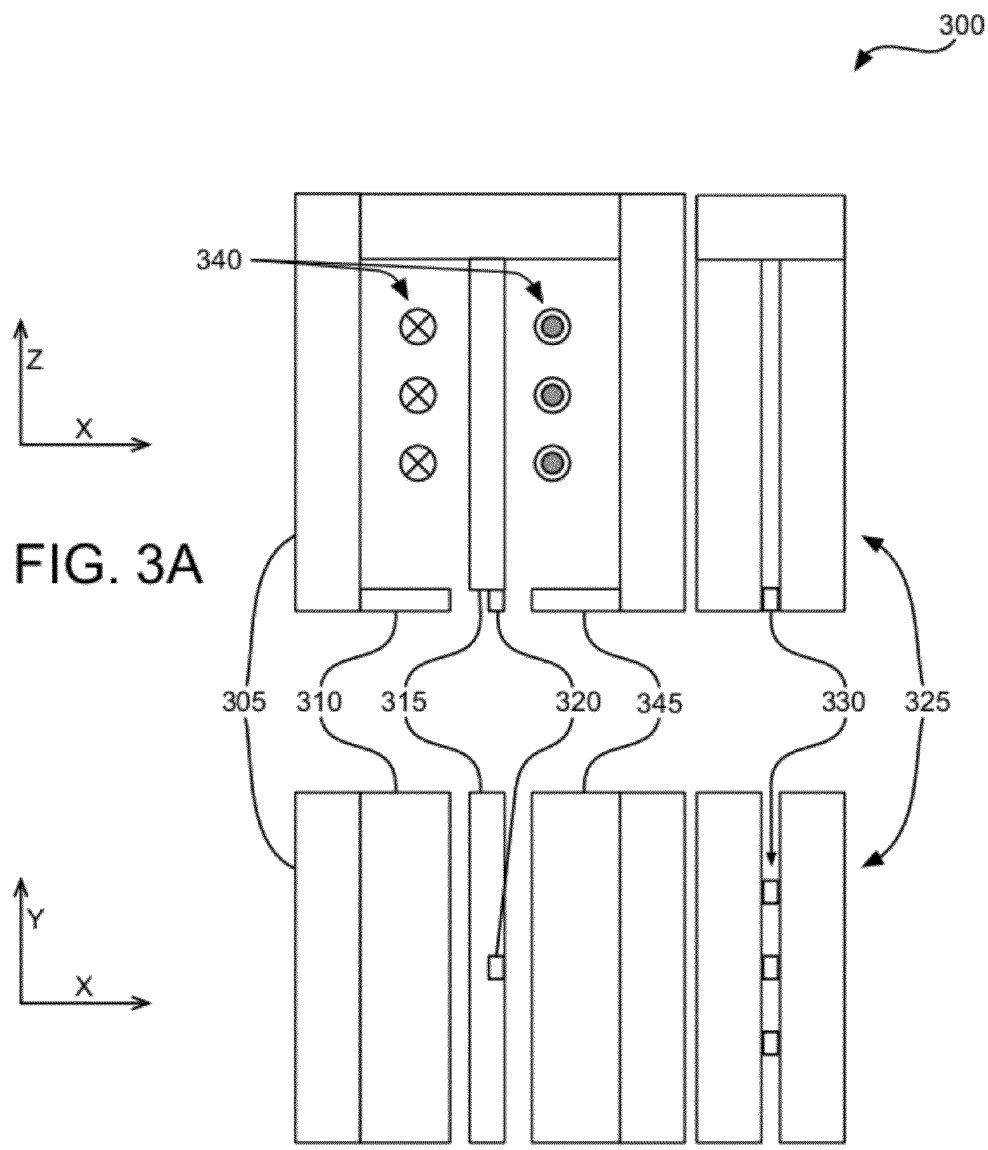
FIGS. 3A and 3B illustrate two views of an example transducer head with multiple read sensors in a read sensor set located up-track of a write pole.

FIGS. 3A and 3B illustrate two views of an example transducer head 300 with multiple read sensors in a read sensor set 330 located up-track of a write pole 320. The X, Y, and Z labeled axes are meant for illustrative purposes only and are not meant to limit the scope of the invention. FIG. 3A illustrates a side view of the transducer head 300. FIG. 3B illustrates a bottom view of the transducer head 300. The transducer head 300 includes a write pole 320 and a return pole 305, which are coupled by a yoke 315 and separated by front shield 310. In operation, electric current in a coil 340 positioned around the yoke 315 creates a magnetic field in the return pole 305 and the write pole 320 that may be used to affect the magnetization of an associated storage medium. In one implementation, the write pole 320 perpendicularly magnetizes the associated storage medium. Another shield 345 is positioned between the write pole 320 and a read shield 325.

The read sensor set 330 is contained by the read shield 325 and positioned up-track of the write pole 320. In the implementation depicted in FIGS. 3A and 3B, the read sensor set 330 is contained by the same read shield 325. Each of the read sensors in the read sensor set 330 have different write pole to read sensor offsets thereby allowing a determination of the write pole 320 position by analyzing information associated with any of the read sensors that return a read signal. In other words, different read sensors may be used to assist the write pole 320 to maintain a desired data track for data tracks from the inner diameter to the outer diameter of the associated storage medium.

As depicted in FIGS. 3A and 3B, transducer head 300 has three read sensors in the read sensor set 330, although the number of read sensors may differ in various implementations. In one implementation, the transducer head 300 includes at least ten read sensors. In another implementation, the number of read sensors is determined as a function of the areal density of the associated BPM.

FIGS. 4A and 4B illustrate two views of an example transducer head 400 with multiple read sensor sets 430 and 435, each with multiple reader sensors, located down and up-track of a write pole 420. The X, Y, Z labeled axes are meant for illustrative purposes only and are not meant to limit the scope of the invention. FIG. 4A illustrates a side view of the transducer head 400. FIG. 4B illustrates a bottom view of the transducer head 400. The transducer head 400 includes a write pole 420 and a return pole 405, which are coupled by a yoke 415 and separated by front shield 410. In operation, electric current in a coil 440 positioned around the yoke 415 creates a magnetic field in the return pole 405 and the write pole 420 that may be used to affect the magnetization of an associated storage medium. In one implementation, the write pole 420 perpendicularly magnetizes the associated storage medium. Another shield 445 is positioned between the write pole 420 and a read shield 425.

At least one read sensor contained by the read shield 425 is positioned up-track of the write pole 420. In the implementation depicted in FIGS. 4A and 4B, the read sensor set 430 is positioned up-track of the write pole 420 and contained by a single read shield 425. Furthermore, at least one read sensor contained by a read shield 450 is positioned down-track of the write pole 420. In the implementation depicted in FIGS. 4A and 4B, the read sensor set 435 is positioned down-track of the write pole 420 and contained by a single read shield 450. Each read sensor in the read sensor sets 430, 435 have different write pole to read sensor offsets, thereby allowing a determination of the write pole 420 position by analyzing information associated with any of the read sensors that return a read signal. In other words, each read sensor presents a different offset from the write pole 420 along the X and Y axes, which can provide multiple unique offsets from which to determine the position of the write pole 420 relative to the track. Different read sensors may be used to assist the write pole 420 to maintain a desired data track for data tracks from the inner diameter to the outer diameter of the associated storage medium.

As depicted in FIGS. 4A and 4B, transducer head 400 has three read sensors in the read sensor set 430 located up-track and three read sensors in the read sensor set 435 located down-track of the write pole 420, although the number of read sensors may differ in various implementations. In one implementation, the transducer head 400 includes at least ten read sensors. In another implementation, the number of read sensors is determined as a function of the areal density of the associated BPM. Beneficially, the use of multiple read sensors at both up-track and down-track offsets from the write pole provides multiple unique offsets and increases the likelihood that at least one read sensor will track with the write pole.

FIGS. 5A and 5B illustrate two views of an example transducer head 500 with multiple read sensor sets 530, 550 and multiple reader shields 525, 535, the read sensor sets being located up-track of a write pole 520. The X, Y, and Z labeled axes are meant for illustrative purposes only and are not meant to limit the scope of the invention. FIG. 5A illustrates a side view of the transducer head 500. FIG. 5B illustrates a bottom view of the transducer head 500. The transducer head 500 includes a write pole 520 and a return pole 505 which are coupled by a yoke 515 and separated by front shield 510. In operation, electric current in a coil 540 positioned around the yoke 515 creates a magnetic field in the return pole 505 and the write pole 520 that may be used to affect the magnetization of an associated storage medium. In one implementation, the write pole 520 perpendicularly magnetizes the associated storage medium. Another shield 545 is positioned between the write pole 520 and a read shield 525.

At least one read sensor in read sensor set 530 is contained by the read shield 525 and positioned up-track of the write pole 520. Additionally, at least one read sensor in the read sensor set 550 is contained by the read shield 535 and also positioned up-track of the write pole 520 and the read shield 525. It should be understood, however, that multiple read sensor sets may be positioned down track from the write pole 520 in other implementations. In the implementation depicted in FIGS. 5A and 5B, the plurality of read sensor sets 530, 550 are contained by the different read shields 525, 535. The plurality of individual read sensors within each read sensor set 530, 550 have different write pole to read sensor offsets thereby allowing a determination of the write pole 520 position by analyzing information associated with any of the read sensors that return a data signal. In other words, each read sensor presents a different offset from the write pole 520 along the X and Y axes (even through all the read sensors are on the same side of the write pole 520), which can provide multiple unique offsets from which to determine the position of the write pole 520 relative to the track. Different read sensors may be used to assist the write pole 520 to maintain a desired data track for data tracks from the inner diameter to the outer diameter of the associated storage medium.

As depicted in FIGS. 5A and 5B, transducer head 500 has three read sensors in read sensor set 530 associated with read shield 525 and three read sensors in read sensor set 550 associated with read shield 535, although the number of read sensors may differ in various implementations. In one implementation, the transducer head 500 includes at least ten read sensors. In another implementation, the number of read sensors is determined as a function of the areal density of the associated BPM. Beneficially, the use of multiple read sensors at either different up-track offsets and/or different down-track offsets from the write pole provides multiple unique offsets and increases the likelihood that at least one read sensor will track with the write pole.

FIG. 6 depicts a flow diagram illustrating example operations 600 for using multiple read sensors to accommodate various alignments of a transducer head with a storage medium to maintain a consistent data track during writing. During writing to an associated storage medium, a transducer head may use a read before write process to maintain alignment with the desired data track. A transducer head including a plurality of read sensors increases the likelihood that a signal from at least one of the read sensors will return data track information.

At a detecting operation 602, at least one read sensor on a transducer head detects a read signal from an associated storage medium. In one implementation, the associated storage medium is a bit patterned medium. In one implementation, the plurality of read sensors are located up-track from a write pole, with each read sensor having constant data track direction offsets and different cross track direction offsets from the write pole. In another implementation, the plurality of read sensors are located up-track from a write pole, with each read sensor having different data track direction offsets than at least one other read sensor and different cross track direction offsets from the write pole. In yet another implementation, individual read sensors of the plurality are located both down-track and up-track from a write pole.

A selection operation 604 selects at least one signal read from at least one of the plurality of read sensors. In one implementation, one or more read sensors detecting the highest SNR read signal(s) are selected to assist in determining the read location. In another implementation, the multiple read signals are combined to generate an enhanced read signal with an enhanced SNR. In yet another implementation, a prior calibration operation (not shown) generates a table of which read sensor(s) to use depending on the radial location of the transducer head.

A determine read location operation 606 determines the location of the selected read sensor(s) relative to the storage medium, as identified by the read signal(s). In one implementation, the read signal includes location information understood by the servo control logic of the storage device. Such information may be used to compute a read location (e.g., the location of the selected read sensor) relative to the surface of the storage medium.

A write pole location operation 608 determines the write pole location in relation to the associated storage medium, based on the selected read location. In one implementation, the offsets of the one or more selected read sensors relative to the write pole on the transducer head are known. Therefore, having established the read location relative to the disc, the write pole location relative to the disc can be computed using geometric arithmetic. An adjustment operation 610 adjusts the radial positioning of the transducer head (and therefore the write pole affixed thereto) based on the determined write pole location (e.g., by moving the actuator arm relative to the disc).

While the exemplary implementations herein are applied to bit patterned media, it should be understood that they are also applicable to other types of media, such as patterned media and continuous media and their respective methods of recording.

The above specification, examples and data provide a complete description of exemplary implementations of methods and apparatus for writing data to media. Although various implementations of the apparatus have been described above with a certain degree of particularity, or with reference to one or more individual implementations, those skilled in the art could make numerous alterations to the disclosed implementations without departing from the spirit or scope of this invention. It is intended that all matter contained in the above description and shown in the accompanying drawings shall be interpreted as illustrative only of particular implementations and not limiting. Changes in detail or structure may be made without departing from the basic elements of the invention as defined in the following claims.

What is claimed is:

1. A method comprising:
  detecting read signals from a data track of a storage medium by a plurality of read sensors positioned in a cross-track alignment with respect to the data track and selecting read signals from less than all of the plurality of read sensors to generate a position signal.

2. The method of claim 1, further comprising:
  determining a position of a write pole affixed to a transducer head based on the position signal.

3. The method of claim 1, further comprising:
  adjusting radial positioning of a transducer head based on the position signal.

4. The method of claim 1, wherein each of the read sensors is positioned relative to a write pole affixed to a transducer head by a unique offset in the data track direction.

5. The method of claim 1, wherein each of the read sensors is positioned relative to a write pole affixed to a transducer head by a unique combination of a data track direction offset and a cross track direction offset.

6. The method of claim 1, further comprising: selecting the read signals based on radial positioning of a transducer head relative to the surface of the storage medium.

7. The method of claim 1, wherein selecting the read signals is based on signal to noise ratio of the read signals, and the selected read signals have a relatively higher signal to noise ratio than one or more unselected read signals of the plurality of read sensors.

8. The method of claim 1, wherein at least one individual read sensor of the plurality of read sensors is located up-track from a write pole affixed to a transducer head and at least one other individual read sensor of the plurality of read sensors is located down-track from the write pole.

9. The method of claim 1, further comprising:
combining at least two of the selected read signals during a readback operation, the combination enhancing the signal-to-noise ratio of read data detected by a transducer head during the readback operation.

10. A system comprising:
a transducer head; and
a plurality of read sensors affixed to the transducer head, wherein the system is configured to monitor read signals from the plurality of read sensors and select read signals from less than all of the plurality of read sensors to generate a position signal and to combine at least two of the selected read signals during a readback operation to enhance the signal-to-noise ratio of read data detected by a transducer head during the readback operation.

11. The system of claim 10, configured to determine a position of a write pole affixed to the transducer head based on the position signal.

12. The system of claim 10, configured to adjust radial positioning of the transducer head based on the selected read signals.

13. The system of claim 10, wherein each of the read sensors is positioned relative to a write pole affixed to the transducer head by a unique offset.

14. The system of claim 10, wherein each of the read sensors is positioned relative to a write pole affixed to the transducer head by a unique combination of a data track direction offset and a cross track direction offset.

15. The system of claim 10, wherein a storage medium data track is provided on a surface of a storage medium and the read signals are selected based on radial positioning of the transducer head relative to the surface of the storage medium.

16. The system of claim 10, wherein at least one of the selected read signals has a relatively higher signal to noise ratio than the signal of one or more unselected read sensors of the plurality of read sensors.

17. The system of claim 10, wherein at least one of the plurality of read sensors is located up-track from a write pole affixed to the transducer head and at least one other read sensor of the plurality of read sensors is located down-track from the write pole.

18. The system of claim 10, wherein combining the at least two of the selected read signals comprises summing the at least two of the selected read signals.

19. A system comprising:
a storage medium including a plurality of concentric data tracks between an inner diameter and an outer diameter of the storage medium;
a transducer head;
a plurality of read sensors affixed to the transducer head and positioned in a cross-track alignment with respect to a data track; and
a write pole affixed to the transducer head and uniquely positioned relative to each of the read sensors, wherein at least one of the plurality of read sensors is aligned with a same data track as the write pole regardless of an alignment of the transducer head with the data track when the transducer head is positioned between the inner diameter and the outer diameter of the storage medium.

20. The system of claim 10, configured to generate the position signal based on a read signal of the plurality of read sensors having the greatest signal-to-noise ratio.

* * * * *